United States Patent
Grove et al.

[11] 3,802,290
[45] Apr. 9, 1974

[54] ROLLER NUT ASSEMBLY

[75] Inventors: Donald E. Grove, Palos Verdes Estates; Carlisle F. Manaugh, Pacific Palisades, both of Calif.

[73] Assignee: G/M Lift Corporation, Los Angeles, Calif.

[22] Filed: Sept. 28, 1972

[21] Appl. No.: 293,081

[52] U.S. Cl. ............................................. 74/459
[51] Int. Cl. ........................................ F16h 55/22
[58] Field of Search ...................... 74/459, 424.8 R

[56] References Cited
UNITED STATES PATENTS

| | | | |
|---|---|---|---|
| 3,648,535 | 3/1973 | Maroth | 74/459 X |
| 3,296,880 | 1/1967 | Maroth | 74/459 X |
| 3,720,115 | 3/1973 | Vertin | 74/465 X |

*Primary Examiner*—Leonard H. Gerin
*Attorney, Agent, or Firm*—Jessup & Beecher

[57] ABSTRACT

An improved roller nut assembly is provided which finds particular utility as a mechanical transmission when used in conjunction with a threaded member, and which serves to drive a load in a linear direction along said threaded member when either the nut assembly or the threaded member is turned. The nut assembly to be described includes a plurality of roller pins which extend radially inwardly from an annular support member and which protrude from the inner surface thereof. The annular member is supported in coaxial relationship with the threaded member. The rollers pins engage the helical threads of the threaded member, and they roll along the threads and rotate about their own axes as the nut assembly or threaded member is turned. The nut assembly also includes a guide annulus which is mounted axially adjacent the aforesaid annular member, likewise in coaxial relationship with the threaded member. The guide annulus includes a plurality of free-running rollers which engage the outer diameter of the threaded member and which are positioned to ride on the peaks of the threads and prevent cocking of the nut assembly, as the nut assembly or threaded member is turned.

3 Claims, 6 Drawing Figures

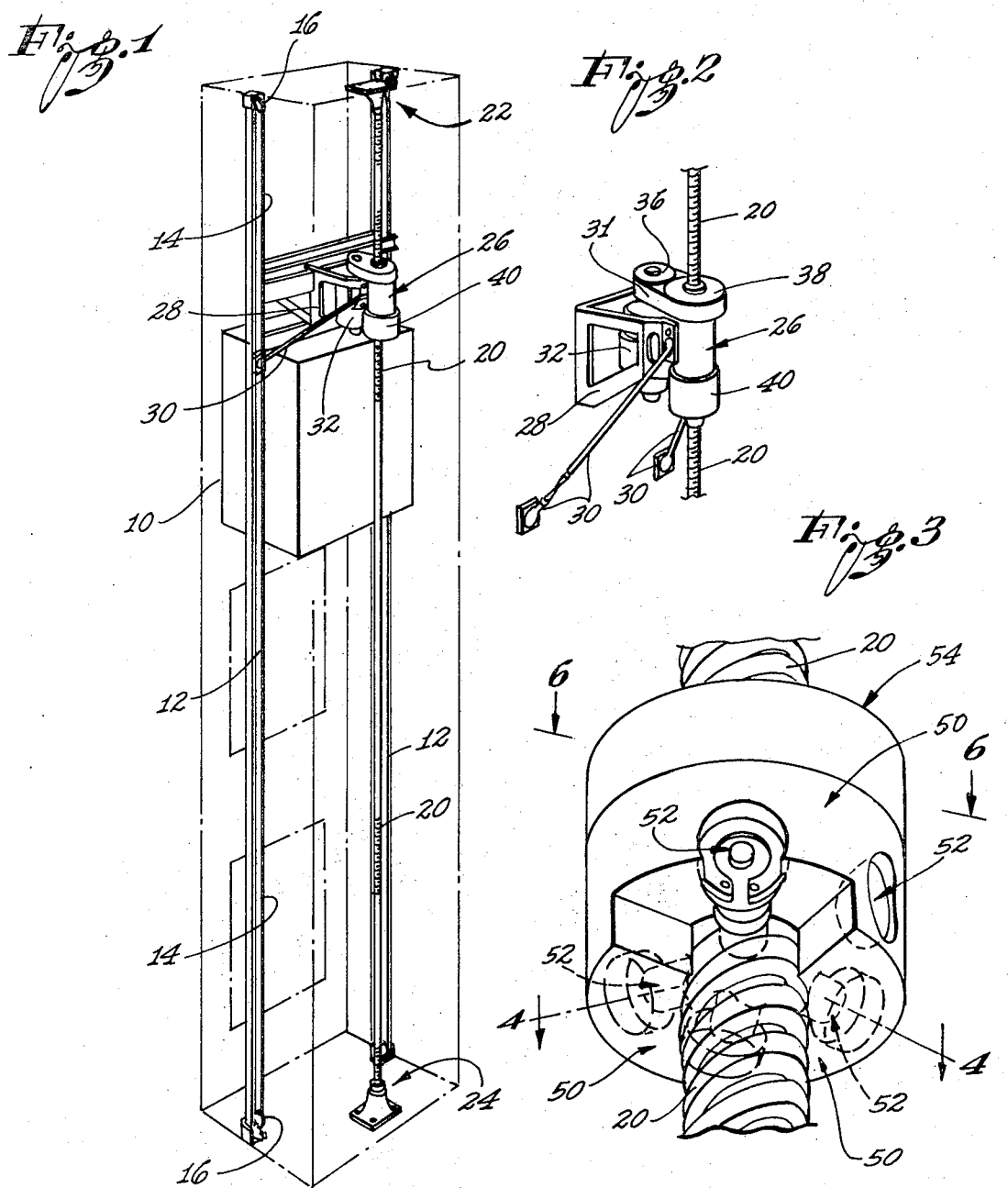

ROLLER NUT ASSEMBLY

BACKGROUND OF THE INVENTION

Copending application Ser. No. 40,611, filed May 26, 1970 describes an improved elevator system which includes an elongated threaded member which is hung vertically in tension, and which also includes a nut assembly threaded to the threaded member. The elevator cab is attached to the nut assembly and is moved linearly up and down as the nut assembly or threaded member is turned. The improved roller nut assembly of the present invention finds particular utility in such a system, since it is capable of supporting substantial loads and yet of being freely movable without jamming or cocking, up or down the threaded member, when it or the threaded member is turned.

BRIEF DESCRIPTION OF THE DRAWINGS

FIG. 1 is an elevational perspective representation of an elevator and vertical transportation system such as described in the aforesaid copending application;

FIG. 2 is a fragmentary representation of certain of the operating components of FIG. 1;

FIG. 3 is a perspective representation of a portion of a vertical threaded member included in the system of FIGS. 1 and 2, and of a roller nut assembly which may be constructed to incorporate the teachings of the present invention;

DETAILED DESCRIPTION OF THE ILLUSTRATED EMBODIMENT

Figure 5:
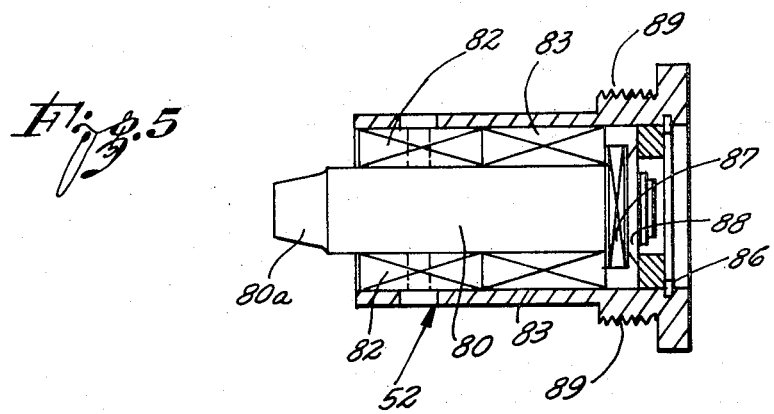
FIG. 5 is a side section of a roller cartridge element includes in the roller nut assembly and taken essentially along the line 5—5 of FIG. 4.
Figure 4:
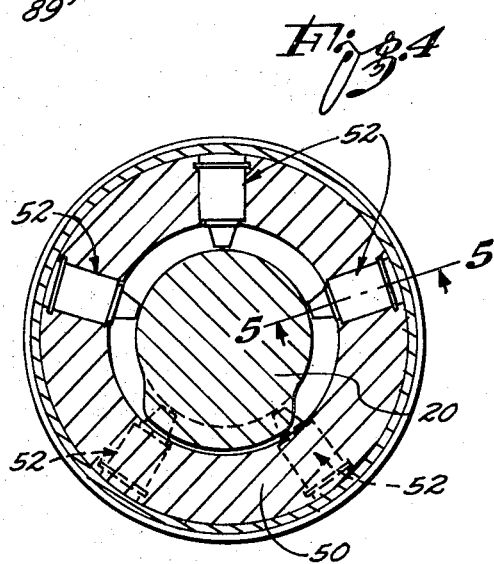
FIG. 4 is a cross-sectional view taken along the line 4—4 of FIG. 3.

The elevator and vertical transportation system shown in FIGS. 1 and 2, as mentioned above, is similar to that described in copending application Ser. No. 40,611. As illustrated in FIGS. 1 and 2, for example, the elevator system includes an elevator cab 10. The cab 10 may, for example, be mounted in a usual type of elevator frame which, for example, includes a pair of vertical T-rails 12. The T-rails are positioned on opposite sides of the elevator frame, and they serve as guides for the elevator cab 10. A usual counterweight system (not shown) may also be provided. Also, in accordance with existing safety codes, for example, usual overspeed safety braking mechanisms, including a wire rope 14 and a pair of pulleys 16, may be provided which prevent the cab from falling freely in the elevator shaft in speeds in excess of a predetermined maximum.

In the aforesaid elevator system, the driving mechanism for the elevator cab 10 comprises an elongated and vertical screw member 20 which is mounted in tension from the top of the hatchway framework by means, for example, of a universal coupling assembly 22 which is described in some detail in the copending application. The screw member 20 is also mounted to the lower end of the elevator framework by means of a further universal coupling assembly 24 which also is described in some detail in the copending application.

The vertical screw member 20 is mounted in the elevator framework in a manner such that it is fully under tension at all times during the operation of the elevator system, so as to be immune from compressive loads which would otherwise tend to limit the useable length of the screw member, since such compressive loads tend to cause the screw member to buckle and fail.

In the illustrated embodiment, a nut assembly 26, which is constructed in accordance with the concepts of the present invention, threadably engages the screw member 20, and is supported on the cab structure by means, for example, of an appropriate bracket 28 and struts 30. An electric motor 32 (FIG. 2) is mounted within the bracket 28, and the motor is mechanically coupled to the rotating nut portion of the nut assembly 26 through a belt 34. The belt 34 may, for example, be of the type known as the "Poly-V" belt. As mentioned above, other types of couplings, such as gear or direct couplings, may be used between the drive motor and the nut assembly. The belt 34 in the illustrated embodiment is coupled between the drive pulley 36 on the drive shaft and the drive motor 32 and a driven sheave 38 attached to the rotating nut portion of the nut assembly.

A magnetic brake 40 may also be mounted on the nut assembly 26, and the magnetic brake may be spring actuated so as to hold the nut against rotation on the screw 20 whenever power is removed, for example, from the motor 32.

The rotating nut portion of the nut assembly is shown in more detail in FIG. 3. As shown in FIG. 3, the rotating nut portion includes an annular support member 50 which, as shown, is mounted coaxially with the threaded member 20. A plurality of cartridges 52 are supported in the annular member 50, and each of the cartridges 52 houses a roller pin which protrudes from its inner end and into engagement with the helical threads on the threaded member 20.

Figure 6:
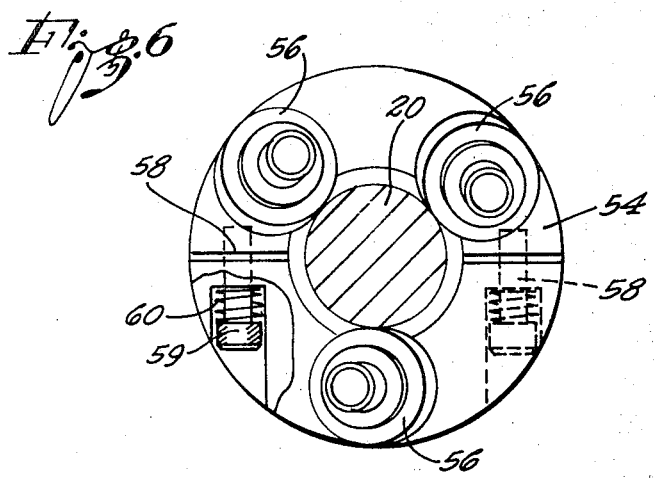
FIG. 6 is a cross-section of another portion of the roller nut assembly taken essentially along the line 6—6 of FIG. 3.

A guide annulus 54 is mounted adjacent the annular member 50, as shown in FIG. 3, likewise in coaxial relationship with the threaded member. The guide annulus 54 includes a plurality of free-running rollers 56 (FIG. 6) which engage the outer diameter of the threaded screw member 20, and which are positioned to ride along the helical path presented by the threads at the outer diameter of the screw member. The free-running rollers 56 are held in place in the annular member 50 by means, for example, of a cap screw 58 having a head 59 engaging a resilient spring member 60.

As best shown in FIG. 5, for example, each of the cartridges 52 comprises a roller pin 80 whose inner end 80a protrudes from the cartridge sleeve to engage the helical screw of the threaded member 20. The roller pin 80 is supported in the cartridge sleeve within needle bearings 82 and 83, and it is held in place by a back-up ring 84 and retaining ring 86. A thrust bearing 87 and Belleville spring 88 are interposed between the end of the roller and the back-up ring 84. The sleeve of the cartridge 52 has threads 89 so that it may be removable from the annular member 50 for servicing and replacement purposes. The roller pin 80 is movable lengthwise in the cartridge 52, and the Belleville spring 88 biases the roller pin radially inwardly, for the distribution and equalizing to all the roller pins of proportionate shares of the load caused by load errors, angular inaccuracies and tolerance accumulations.

The overall assembly illustrated in the accompanying drawing and described above comprises an essentially friction free nut which moves freely up and down the screw 20 as the nut or the screw is turned, and which is appropriately guided, so that the nut assembly may support an appreciable load, such as the elevator cab 10 in FIG. 1, without jamming or cocking of the roller nut assembly.

While a particular embodiment of the invention has been shown and described, modifications may be made, and it is intended in the following claims to cover all such modifications which fall within the spirit and scope of the invention.

What is claimed is:

1. An anti-friction roller nut assembly for use in conjunction with an elongated threaded member having at least one helical thread extending therealong, said assembly comprising: an annular member adapted to be mounted coaxially on said elongated member; a plurality of longitudinally-movable roller pins supported by said annular member and extending essentially radially with respect to said elongated threaded member; a plurality of roller bearings mounted in said first-named annular member for respectively supporting said roller pins to permit said roller pins to rotate about their own axes upon relative movement of said elongated threaded member and said nut assembly; resilient means for biasing said roller pins radially inwardly to permit the distribution and equalization of all said roller pins of loads caused by lead errors, angular inaccuracies, tolerance accumulations, and the like, said pins having inner ends protruding inwardly from the inner surface of said annular member to engage the helical thread of said elongated member and roll along said thread upon relative rotational movement of said elongated member and said roller nut assembly; a further annular member mounted axially with respect to said first-named annular member and coaxial with said elongated member; and a plurality of rollers mounted in said further annular member and engaging the outer diameter of said threaded member to guide said nut assembly and to prevent cocking thereof.

2. The combination defined in claim 1, and which includes a plurality of removable cartridges mounted in said first-named annular member, in which said roller pins are rotatably mounted in respective ones of said cartridges, and in which said roller bearing means are mounted in each of said cartridges for supporting said pins therein, so as to permit said pins to rotate about their own axes within said cartridges upon relative movement between said elongated threaded member and said nut assembly.

3. The combination defined in claim 2, in which said roller pins are movable lengthwise in said cartridges, and in which said resilient means is included in each of said cartridges for biasing said roller pins radially inwardly to permit the distribution and equalization to all of said roller pins of loads caused by lead errors, angular inaccuracies, tolerance accumulations, and the like.

* * * * *